United States Patent
Otani et al.

(10) Patent No.: US 10,793,660 B2
(45) Date of Patent: Oct. 6, 2020

(54) MACROMONOMER COPOLYMER AND METHOD FOR PRODUCING SAME

(71) Applicant: Mitsubishi Chemical Corporation, Chiyoda-ku (JP)

(72) Inventors: Go Otani, Tokyo (JP); Taeko Oonuma, Tokyo (JP); Yoshiko Irie, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/190,622

(22) Filed: Nov. 14, 2018

(65) Prior Publication Data

US 2019/0077898 A1 Mar. 14, 2019

Related U.S. Application Data

(63) Continuation of application No. PCT/JP2017/010151, filed on Mar. 14, 2017.

(30) Foreign Application Priority Data

May 19, 2016 (JP) .................................. 2016-100647

(51) Int. Cl.
  C08F 290/04 (2006.01)
  C08F 2/38 (2006.01)
  C08F 220/18 (2006.01)
  C08F 220/14 (2006.01)

(52) U.S. Cl.
  CPC ............ *C08F 290/046* (2013.01); *C08F 2/38* (2013.01); *C08F 220/14* (2013.01); *C08F 220/18* (2013.01)

(58) Field of Classification Search
  CPC .................................................. C08F 290/046
  See application file for complete search history.

(56) References Cited

U.S. PATENT DOCUMENTS

| | | | |
|---|---|---|---|
| 4,554,324 A | 11/1985 | Husman et al. | |
| 5,053,461 A | 10/1991 | Tone et al. | |
| 5,336,725 A | 8/1994 | Tone et al. | |
| 5,483,003 A | 1/1996 | Siol et al. | |
| 5,708,095 A | 1/1998 | Grezzo Page et al. | |
| 6,100,350 A | 8/2000 | Wilczek et al. | |
| 6,174,953 B1 | 1/2001 | Huybrechts | |
| 2002/0054996 A1* | 5/2002 | Rheenen ................ | B32B 27/08 428/420 |
| 2004/0171732 A1 | 9/2004 | Matsuzaki et al. | |
| 2016/0185893 A1 | 6/2016 | Oonuma et al. | |
| 2016/0237192 A1 | 8/2016 | Fujiyama et al. | |

FOREIGN PATENT DOCUMENTS

| | | | |
|---|---|---|---|
| CN | 1457347 A | 11/2003 | |
| CN | 1465452 A | 1/2004 | |
| CN | 101501077 A | 8/2009 | |
| CN | 104870504 A | 8/2015 | |
| CN | 105745239 A | 7/2016 | |
| EP | 1 795 543 A1 | 6/2007 | |
| EP | 2 937 367 A1 | 10/2015 | |
| EP | 3 059 269 A1 | 8/2016 | |
| JP | 2-67303 A | 3/1990 | |
| JP | 5-170838 A | 7/1993 | |
| JP | 6-298882 A | 10/1994 | |
| JP | 7-506393 A | 7/1995 | |
| JP | 10-87754 A | 4/1998 | |
| JP | 11-240854 A | 9/1999 | |
| JP | 2000-509425 A | 7/2000 | |
| JP | 2000-514845 A | 11/2000 | |
| JP | WO 2002/074822 A1 | 9/2002 | |
| JP | 2003-2934 A | 1/2003 | |
| JP | 2003-165815 A | 6/2003 | |
| JP | 2004-513890 A | 5/2004 | |
| JP | 2008-37971 A | 2/2008 | |
| JP | 2011-122113 A | 6/2011 | |
| WO | WO 93/22355 A1 | 11/1993 | |
| WO | WO 97/31031 A1 | 8/1997 | |
| WO | WO 97/43352 A1 | 11/1997 | |
| WO | WO 99/42505 A1 | 8/1999 | |
| WO | WO 02/26217 A2 | 4/2002 | |
| WO | WO 2003/000759 A1 | 1/2003 | |
| WO | WO 2015/056668 A1 | 4/2015 | |
| WO | WO-2015056668 A1 * | 4/2015 | ............ C08F 220/14 |

OTHER PUBLICATIONS

Office Action dated Nov. 5, 2019 in Korean Patent Application No. 10-2018-7032823, 11 pages (with English machine translation obtained from the Global Dossier).
Extended European Search Report dated Apr. 15, 2019 in European Patent Application No. 17798997.7, 12 pages.
International Search Report dated May 30, 2017 in PCT/JP2017/010151 (with English translation), 5 pages.
Japanese Office Action dated Oct. 31, 2017 in Japanese Patent Application No. 2017-517369 (with unedited computer generated English translation), 11pages.
Japanese Office Action dated Jul. 10, 2018 in Japanese Patent Application No. 2017-517369 (with unedited computer generated English translation), 14 pages.

(Continued)

*Primary Examiner* — Mark S Kaucher

(74) *Attorney, Agent, or Firm* — Oblon, McClelland, Maier & Neustadt, L.L.P.

(57) ABSTRACT

Provided is a macromonomer copolymer (Y) including a monomer unit of a specific macromonomer (A) and a monomer unit of a comonomer (B) copolymerizable with the macromonomer (A), in which a value of Hx represented by a specific expression is 0.05 to 0.40.

11 Claims, No Drawings

(56) References Cited

OTHER PUBLICATIONS

Korean Office Action dated May 13, 2020 in Patent Application No. 10-2018-7032823 (with English translation), 9 pages.
Chinese Office Action dated Jun. 28, 2020, in corresponding Chinese Patent Application No. 201780029735:9 (with English machine translation obtained from the Global Dossier), citing documents AO-AT therein.

* cited by examiner

MACROMONOMER COPOLYMER AND METHOD FOR PRODUCING SAME

This application is a continuation application of International Application No. PCT/JP2017/010151, filed on Mar. 14, 2017, which claims the benefit of priority of the prior Japanese Patent Application No. 2016-100647, filed in Japan on May 19, 2016, the entire contents of which are incorporated herein by reference.

BACKGROUND OF THE INVENTION

Field of the Invention

The present invention relates to a macromonomer copolymer and a method for producing the same.

Description of Related Art

From many of monomers having reactive unsaturated bonds, it is possible to produce polymers by being reacted at an appropriate condition using a catalyst that causes chain transfer. In a case where a polymer is industrially utilized, a homopolymer obtained by using one type of monomer cannot meet various requirements of materials. Thus, a method of mixing different types of polymers is used. However, simply mixing different types of polymers results in phase separation (referred to as macro-phase separation) having a domain of a relatively large size due to the polymers being not compatible with each other, which may often make it difficult for a mixture of the different types of polymers to express all properties possessed by the respective polymers.

As a method for solving the above problem, a method using a block copolymer in which two or more types of polymer segments are chemically bonded is known. As described above, a mixture of different types of polymers causes phase separation due to low compatibility between the polymers. However, since the polymer segments in the block copolymer are linked to each other by a chemical bond, a phase separation structure thereof becomes a nanometer size (referred to as micro-phase separation). Therefore, it is possible to express all properties possessed by the respective polymer segments.

For example, an acrylic resin molded body is excellent in transparency, but has a problem of being hard and brittle. In a case of a (meth)acrylic block copolymer obtained by chemically bonding the above-mentioned two or more types of polymer segments, a phase-separation structure becomes a micro-phase separation structure, and thus properties of the respective polymer segments are exerted, so that it is possible to realize an acrylic resin molded body which is not only excellent in transparency but also excellent in impact resistance and flexibility.

As a method for producing a (meth)acrylic block copolymer, a method for producing a (meth)acrylic block copolymer in which an acryl-based macromonomer is produced in advance by using a trace amount of a cobalt complex having an extremely high chain transfer constant, and the acryl-based macromonomer and another acryl-based monomer are copolymerized is known (for example, Published Japanese Translation No. 2000-514845 of the PCT International Publication).

The macromonomer is a polymer having a functional group capable of undergoing a polymerization reaction and is also referred to as a macromer.

Published Japanese Translation No. 2000-514845 of the PCT International Publication describes a method of producing a macromonomer copolymer in which a macromonomer is loaded in a reactor and heated, a comonomer and a polymerization initiator are added dropwise thereto, and copolymerization is carried out to increase a conversion rate of the macromonomer up to about 80% to about 100%.

SUMMARY OF THE INVENTION

However, in the production method described in Published Japanese Translation No. 2000-514845 of the PCT International Publication, a composition of the macromonomer copolymer tends to be non-uniform, and furthermore, a homopolymer composed only of the comonomer tends to be produced at a later stage of polymerization, so that there is a problem that it is difficult to control a micro-phase separation structure. In addition, in a case where the macromonomer remains in a large amount, there is also a problem that a thermal decomposition resistance is decreased, which is unsuitable for heat-molding.

In a case where it is difficult to control a micro-phase separation structure, it is difficult to cause properties of the respective polymer segments to be sufficiently exerted. In addition, in a case of having a low thermal decomposition resistance, it may be difficult to carry out heat-molding.

The present invention provides a macromonomer copolymer having a high ability to control a micro-phase separation structure and a good thermal decomposition resistance, and a method for producing the same.

The present invention has the following aspects.

[1] A macromonomer copolymer (Y), including:

a monomer unit of a macromonomer (A) represented by General Formula (1); and a monomer unit of a comonomer (B) copolymerizable with the macromonomer (A), in which a value of Hx represented by Expression (2) is 0.05 to 0.40.

$$Hx = Hm/Ht \qquad (2)$$

(in Expression (2), Hm is a proton-integrated value of a terminal double bond group at a trans position in $^1$H-NMR in a case where $X_1$ in Formula (1) is a methyl group, and Ht is a proton-integrated value of a terminal double bond group at a trans position in $^1$H-NMR in a case where $X_1$ in General Formula (1) is a methyl group and a hydrogen atom.)

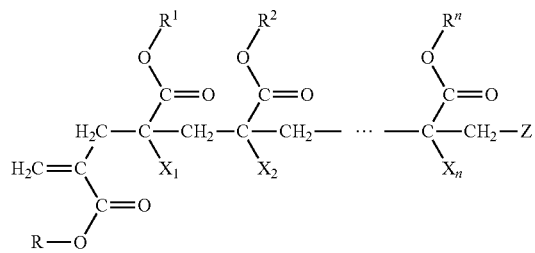

(in the formula, R and $R^1$ to $R^n$ are each independently a hydrogen atom, an alkyl group, a cycloalkyl group, an aryl group, or a heterocyclic group, $X_1$ to $X_n$ are each independently a hydrogen atom or a methyl group, Z is a terminal group, and n is a natural number of 2 to 10,000.)

[2] The macromonomer copolymer (Y) according to [1],
in which in Expression (2), in a case where $^1$H-NMR is measured using an NMR apparatus under a condition of 40° C. in a mixed solvent in which a weight ratio of heavy chloroform and toluene is 88:12, and a peak of tetramethylsilane is set as 0.00 ppm, Hm is a sum of $^1$H-NMR peak-integrated values at 5.43 ppm and 5.47 ppm, and Ht is a sum of $^1$H-NMR peak-integrated values at 5.43 ppm, 5.47 ppm, and 5.52 ppm.

[3] The macromonomer copolymer (Y) according to [1] or [2],
in which a content of a sulfur element contained in the macromonomer copolymer (Y) is 0.002% by mass or less with respect to a total mass of the macromonomer copolymer (Y).

[4] The macromonomer copolymer (Y) according to any one of [1] to [3],
in which the macromonomer copolymer (Y) does not contain a sulfur-containing chain transfer agent residue.

[5] The macromonomer copolymer (Y) according to any one of [1] to [4],
in which a content of an unreacted macromonomer (A) contained in the macromonomer copolymer (Y) is 10% by mass or less with respect to a total mass of the macromonomer copolymer (Y).

[6] The macromonomer copolymer (Y) according to any one of [1] to [5],
in which a content of a polymer composed only of the monomer unit of the comonomer (B) which is contained in the macromonomer copolymer (Y) is 10% by mass or less with respect to a total mass of the macromonomer copolymer (Y).

[7] A method for producing a macromonomer copolymer (Y), including:
carrying out a polymerization reaction of a polymerizable component (X) composed of a macromonomer (A) represented by General Formula (1) and a comonomer (B) copolymerizable with the macromonomer (A), so that a reaction rate of terminal double bonds derived from the macromonomer (A) at the end of the polymerization reaction is 53% by mol to 90% by mol with respect to a total molar number of the terminal double bonds derived from the macromonomer (A).

[8] The method for producing a macromonomer copolymer (Y) according to [7],
in which the comonomer (B) is composed only of acrylate.

[9] The method for producing a macromonomer copolymer (Y) according to [7] or [8],
in which a content of the macromonomer (A) is 0.02% by mol to 8.0% by mol with respect to 100% by mol of the polymerizable component (X).

[10] The method for producing a macromonomer copolymer (Y) according to any one of [7] to [9],
in which a polymerization temperature during a time that occupies 50% or more of the entire polymerization time is 60° C. to 80° C.

[11] The method for producing a macromonomer copolymer (Y) according to any one of [7] to [10],
in which the entire amount of the macromonomer (A) and the comonomer (B) is charged at one time, and then the polymerization reaction is initiated.

[12] The method for producing a macromonomer copolymer (Y) according to any one of [7] to [11],
in which the macromonomer (A) has a number average molecular weight (Mn) of 1,000 or more.

According to the present invention, a macromonomer copolymer having a high ability to control a micro-phase separation structure and a good thermal decomposition resistance is obtained.

DETAILED DESCRIPTION OF THE INVENTION

Hereinafter, a mode for carrying out the present invention (hereinafter referred to as "the present embodiment") will be described in detail. However, the present invention is not limited to the following description, and various modifications can be made within a scope of the gist thereof.

In the following, a monomer component before polymerization is referred to as "~ monomer", and "monomer" may be omitted. In addition, a constituent unit that constitutes a polymer is referred to as "~ monomer unit". In addition, (meth)acrylate refers to methacrylate or acrylate.

The macromonomer copolymer (Y) according to the present invention is obtained by copolymerizing a polymerizable component (X) composed of a macromonomer (A) represented by General Formula (1) and a comonomer (B) which is another polymerizable monomer copolymerizable with the macromonomer (A).

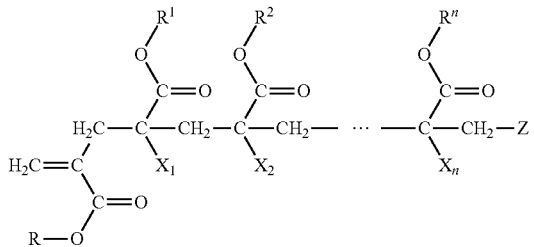

(1)

(in the formula, R and $R^1$ to $R^n$ are each independently a hydrogen atom, an alkyl group, a cycloalkyl group, an aryl group, or a heterocyclic group,
$X_1$ to $X_n$ are each independently a hydrogen atom or a methyl group,
Z is a terminal group, and
n is a natural number of 2 to 10,000.)

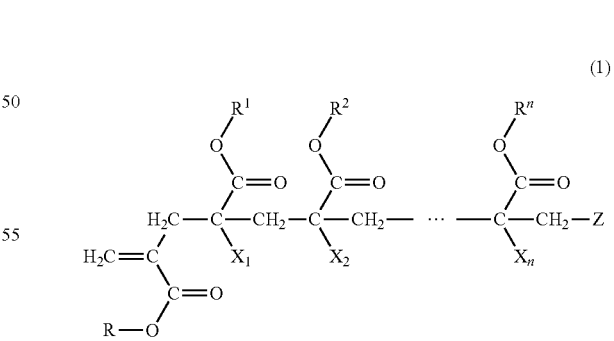

(1)

(In the formula, R and $R^1$ to $R^n$ are each independently a hydrogen atom, an alkyl group, a cycloalkyl group, an aryl group, or a heterocyclic group,
$X_1$ to $X_n$ are each independently a hydrogen atom or a methyl group,
Z is a terminal group, and
n is a natural number of 2 to 10,000.)

Macromonomer (A)

The macromonomer (A) has a group having a radical-polymerizable unsaturated double bond at one terminal of a poly(meth)acrylate segment.

R and $R^1$ to $R''$

In General Formula (1), R and $R^1$ to $R''$ are each independently a hydrogen atom, an alkyl group, a cycloalkyl group, an aryl group, or a heterocyclic group. The alkyl group, cycloalkyl group, aryl group, or heterocyclic group may have a substituent.

Examples of the alkyl group in R and $R^1$ to $R''$ include a branched or straight-chain alkyl group having 1 to 20 carbon atoms. Specific examples thereof include a methyl group, an ethyl group, an n-propyl group, an i-propyl group, an n-butyl group, an i-butyl group, a t-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from the viewpoint of ease of availability, a methyl group, an ethyl group, an n-propyl group, an i-propyl group, an n-butyl group, a t-butyl group, a pentyl group, a hexyl group, a heptyl group, and an octyl group are preferable, with a methyl group, an ethyl group, an n-propyl group, an i-propyl group, an n-butyl group, and a t-butyl group being more preferable, and a methyl group being particularly preferable.

Examples of the cycloalkyl group in R and $R^1$ to $R''$ include a cycloalkyl group having 3 to 20 carbon atoms. Specific examples thereof include a cyclopropyl group, a cyclobutyl group, a cyclopentyl group, a cyclohexyl group, a cycloheptyl group, a cyclooctyl group, a t-butylcyclohexyl group, an isobornyl group, and an adamantyl group. From the viewpoint of ease of availability, a cyclopropyl group, a cyclobutyl group, and an adamantyl group are preferable.

Examples of the aryl group in R and $R^1$ to $R''$ include an aryl group having 6 to 18 carbon atoms. Specific examples thereof include a phenyl group, a benzyl group, and a naphthyl group.

Examples of the heterocyclic group in R and $R^1$ to $R''$ include a heterocyclic group having 5 to 18 carbon atoms. Specific examples thereof include a γ-lactone group, an ε-caprolactone group, and a morpholine group. Examples of a hetero atom contained in the heterocyclic ring include an oxygen atom, a nitrogen atom, and a sulfur atom.

As a substituent in R or $R^1$ to $R''$, a group or atom selected from the group consisting of an alkyl group, an aryl group, a carboxyl group, an alkoxycarbonyl group (—COOR'), a carbamoyl group (—CONR'R''), a cyano group, a hydroxyl group, an amino group, an amide group (—NR'R''), a halogen atom, an allyl group, an epoxy group, an alkoxy group (—OR'), and a group showing hydrophilicity or ionicity is each independently mentioned. Examples of R' or R'' each independently include the same groups as R (where the heterocyclic group is excluded).

Examples of the alkoxycarbonyl group as the substituent in R or $R^1$ to $R''$ include a methoxycarbonyl group.

Examples of the carbamoyl group as the substituent in R or $R^1$ to $R''$ include an N-methylcarbamoyl group and an N,N-dimethylcarbamoyl group.

Examples of the amide group as the substituent in R or $R^1$ to $R''$ include a dimethylamide group.

Examples of the halogen atom as the substituent in R or $R^1$ to $R''$ include a fluorine atom, a chlorine atom, a bromine atom, and an iodine atom.

Examples of the alkoxy group as the substituent in R or $R^1$ to $R''$ include an alkoxy group having 1 to 12 carbon atoms. Specific examples thereof include a methoxy group.

Examples of the group showing hydrophilicity or ionicity as the substituent in R or $R^1$ to $R''$ include an alkali salt of a carboxyl group or an alkali salt of a sulfoxyl group, a poly(alkylene oxide) group such as a polyethylene oxide group and a polypropylene oxide group, and a cationic substituent such as quaternary ammonium base.

R and $R^1$ to $R''$ are preferably at least one selected from an alkyl group and a cycloalkyl group, and more preferably an alkyl group.

The alkyl group is preferably a methyl group, an ethyl group, an n-propyl group or an i-propyl group, and a methyl group is more preferable from the viewpoint of ease of availability.

$X_1$ to $X_n$

In General Formula (1), $X_1$ to $X_n$ are each a hydrogen atom or a methyl group, and a methyl group is preferable. Furthermore, from the viewpoint of ease of synthesis of the macromonomer (A), it is preferable that equal to or greater than half of $X_1$ to $X_n$ are methyl groups.

In General Formula (1), Z is a terminal group in the macromonomer (A). Examples of the terminal group in the macromonomer (A) include a hydrogen atom and a group derived from a radical polymerization initiator which are similar to known terminal groups in polymers obtained by radical polymerization.

A number average molecular weight (Mn) of the macromonomer (A) is 1,000 or more and more preferably 1,000 to 1,000,000, from the viewpoint of mechanical properties and micro-phase separation structure control of a molded body obtained from a molding material containing the macromonomer copolymer (Y). A lower limit value of Mn of the macromonomer (A) is more preferably 3,000 or more, even more preferably 5,000 or more, and particularly preferably 7,000 or more. In addition, an upper limit value of Mn of the macromonomer (A) is preferably 500,000 or less and more preferably 300,000 or less. Specifically, the Mn is preferably 1,000 to 1,000,000, more preferably 3,000 to 500,000, and even more preferably 5,000 to 300,000. In a case where the Mn is equal to or greater than the lower limit value, a weight proportion of a segment derived from the macromonomer (A) contained in the macromonomer copolymer (Y) can be increased, micro-phase separation structure control becomes easy, and good mechanical properties of the macromonomer copolymer (Y) are exhibited. In a case where the Mn is equal to or less than the upper limit value, a weight ratio of a segment derived from the comonomer (B) contained in the macromonomer copolymer (Y) can be increased, micro-phase separation structure control becomes easy, and a viscosity of a mixture at the time of synthesizing the macromonomer copolymer (Y) is within an easy-handling range. The number average molecular weight (Mn) of the macromonomer (A) means a value calculated from a calibration curve of polymethyl methacrylate (PMMA) using gel permeation chromatography (GPC).

Raw Material Monomer of Macromonomer (A)

Examples of a raw material monomer for obtaining the macromonomer (A) include (meth)acrylate such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth) acrylate, n-lauryl (meth)acrylate, n-stearyl (meth)acrylate, cyclohexyl (meth)acrylate, phenyl (meth)acrylate, benzyl (meth)acrylate, isobornyl (meth)acrylate, 2-methoxyethyl (meth)acrylate, 2-ethoxyethyl (meth)acrylate, and phenoxyethyl (meth)acrylate; hydroxyl group-containing (meth) acrylate such as 2-hydroxyethyl (meth)acrylate, 2-hydroxypropyl (meth)acrylate, 4-hydroxybutyl (meth)acrylate, and glycerol (meth)acrylate; a carboxyl group-containing vinyl-based monomer such as (meth)acrylic acid, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, itaconic acid, monomethyl maleate, and monomethyl itaconate; an acid anhydride group-containing vinyl-based monomer such as maleic anhydride and itaconic anhydride; an epoxy group-containing vinyl monomer such as glycidyl (meth)acrylate, glycidyl α-ethyl acrylate, and 3,4-epoxybutyl (meth)acrylate; an amino group-containing (meth)acrylate-based vinyl-based monomer such as dimethylaminoethyl (meth)acrylate and diethylaminoethyl (meth)acrylamide; an amido group-containing vinyl-based monomer such as (meth)acrylamide, N-t-butyl (meth)acrylamide, N-methylol (meth)acrylamide, N-methoxymethyl (meth)acrylamide, N-butoxymethyl (meth)acrylamide, diacetone acrylamide, maleic acid amide, and maleimide; a vinyl-based monomer such as styrene, α-methylstyrene, vinyltoluene, (meth)acrylonitrile, vinyl chloride, vinyl acetate, and vinyl propionate; a multifunctional vinyl-based monomer such as divinylbenzene, ethylene glycol di(meth)acrylate, 1,3-butylene glycol di(meth) acrylate, 1,6-hexanediol di(meth)acrylate, triethylene glycol di(meth)acrylate, tetraethylene glycol di(meth)acrylate, tripropylene glycol di(meth)acrylate, trimethylolpropane tri (meth)acrylate, allyl (meth)acrylate, and N, N'-methylene bis(meth)acrylamide. One or more of these can be appropriately selected and used.

Among these, methacrylate is preferable from the viewpoint of ease of availability of monomers.

As the methacrylate, methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, and 4-hydroxybutyl methacrylate are preferable, with methyl methacrylate, n-butyl methacrylate, and 2-ethylhexyl methacrylate being more preferable.

In addition, as the raw material monomer for obtaining the macromonomer (A), from the viewpoint of heat resistance of the macromonomer copolymer (Y) as a product and a molded body containing the macromonomer copolymer (Y), a monomer composition containing the above-mentioned methacrylate or acrylate is preferable.

Examples of the acrylate include methyl acrylate, ethyl acrylate, n-propyl acrylate, i-propyl acrylate, n-butyl acrylate, i-butyl acrylate, and t-butyl acrylate. Among these, methyl acrylate is preferable from the viewpoint of ease of availability.

A content of methacrylate in a monomer composition for obtaining the macromonomer (A) is preferably 80% by mass to 100% by mass with respect to a total mass of the polymerizable component (X), from the viewpoint of heat resistance of the macromonomer copolymer (A) as a product and a molded body containing the macromonomer copolymer (A). The content of methacrylate is more preferably 82% by mass to 99% by mass, and even more preferably 84% by mass to 98% by mass. A content of acrylate in a monomer composition for obtaining the macromonomer (A) is preferably 0% by mass to 20% by mass, more preferably 1% by mass to 18% by mass, and even more preferably 2% by mass to 16% by mass.

Method for Producing Macromonomer (A)

The macromonomer (A) can be produced by a known method. Examples of a method for producing a macromonomer include a production method using a cobalt chain transfer agent (U.S. Pat. No. 4,680,352), a method of using an α-substituted unsaturated compound such as α-bromomethylstyrene as a chain transfer agent (PCT Internation Publication No. WO88/04304), a method of chemically bonding a polymerizable group (Japanese Unexamined Patent Application, First Publication No. S60-133007, and U.S. Pat. No. 5,147,952), and a method using thermal decomposition (Japanese Published Unexamined Patent Application First Publication No. H11-240854).

Among these, as the method for producing the macromonomer (A), a production method using a cobalt chain transfer agent is preferable from the viewpoint of using a catalyst which allows a small number of production steps and has a high chain transfer constant.

Examples of a method for producing the macromonomer (A) using a cobalt chain transfer agent include a water-based dispersion polymerization method such as a bulk polymerization method, a solution polymerization method, a suspension polymerization method, and an emulsion polymerization method. Among these, the water-based dispersion polymerization method is preferable from the viewpoint of simplifying a collection step for the macromonomer (A). In addition, in a case of the solution polymerization method, it is also possible to obtain the macromonomer copolymer (Y) by a polymerization reaction in which the macromonomer (A) is not collected and the comonomer (B) and a thermal-polymerization initiator are further added directly thereto.

As the cobalt chain transfer agent used in the present invention, a cobalt chain transfer agent represented by Formula (2) can be used, and, for example, cobalt chain transfer agents described in Japanese Patent No. 3587530, Japanese Published Unexamined Patent Application First Publication No. H6-23209, Japanese Published Unexamined Patent Application First Publication No. H7-35411, U.S. Pat. No. 4,526,945, 4,694,054, 4,834,326, 4,886,861, 5,324,879, PCT Internation Publication No. WO95/17435, and Published Japanese Translation No. H9-510499 of the PCT International Publication can be used.

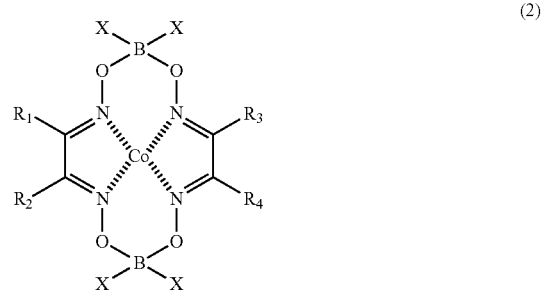

(2)

[In the formula, $R_1$ to $R_4$ are each independently an alkyl group, a cycloalkyl group, or an aryl group; and X's are each independently an F atom, a Cl atom, a Br atom, an OH group, an alkoxy group, an aryloxy group, an alkyl group, or an aryl group.]

As the cobalt chain transfer agent, specifically, bis(boron difluorodimethyl dioxyiminocyclohexane) cobalt (II), bis (boron difluorodimethyl glyoxymate) cobalt (II), bis(boron difluorodiphenyl glyoxymate) cobalt (II), a cobalt (II) complex of a vicinal iminohydroxyimino compound, a cobalt (II) complex of tetraazatetraalkylcyclotetradecatetraene, an N,N'-bis(salicylidene)ethylene diaminocobalt (II) complex, a cobalt (II) complex of dialkyldiazadioxodialkyldodecadiene, and a cobalt (II) porphyrin complex. Among these, bis(boron difluorodiphenyl glyoxymate) cobalt (II) ($R_1$ to $R_4$: phenyl group, X:F atom) which stably exists in an aqueous medium and has a high chain transfer effect is preferable. One or more of these can be appropriately selected and used.

An amount used of the cobalt chain transfer agent is preferably 5 ppm to 350 ppm with respect to 100 parts by mass of the monomer for obtaining the macromonomer (A). In a case where the amount used of the cobalt chain transfer agent is less than 5 ppm, decrease in molecular weight tends to be insufficient. In a case where the amount used of the cobalt chain transfer agent exceeds 350 ppm, the obtained macromonomer (A) tends to be colored.

Examples of a solvent used at the time of obtaining the macromonomer (A) by a solution polymerization method include hydrocarbons such as toluene; ethers such as diethyl ether and tetrahydrofuran; halogenated hydrocarbons such as dichloromethane and chloroform; ketones such as acetone; alcohols such as methanol; nitriles such as acetonitrile; vinyl esters such as ethyl acetate; carbonates such as ethylene carbonate; and supercritical carbon dioxide. These can be used alone or in combination of two or more types.

Reaction mechanism of macromonomer (A) and comonomer (B)

A reaction mechanism between the macromonomer (A) and the comonomer (B) is described in detail in Yamada et al.'s reports (Journal of Polymer Science: Part A: Polymer Chemistry, Vol. 41, pp. 645 to 654 (2003), Progress in Polymer Science 31 (2006) pp. 835 to 877), and the like. Specifically, a terminal double bond group in the macromonomer (A) forms a branched structure in a reaction with an acrylate radical so that copolymerization can be carried out. On the other hand, in a reaction between a terminal double bond group in the macromonomer (A) and a methacrylate radical, it is difficult to form a branched structure and re-cleavage mainly occurs so that the terminal double bond group and the methacrylate radical are regenerated. In a case where styrene is used as the comonomer (B), it is possible to form a branched structure, but progress of reaction tends to be slow. Therefore, for the comonomer (B), it is preferable that acrylate (B1) is used as a main component, and methacrylate (B2) and another monomer (B3) are used, if necessary.

Comonomer (B)

The comonomer (B) is not particularly limited as long as the comonomer (B) is copolymerizable with the macromonomer (A), and various polymerizable monomers can be used, if necessary. Specifically, the same monomers as the monomers for obtaining the macromonomer (A) are mentioned. However, it is preferable that the acrylate (B1) is mainly used from the viewpoint of reactivity with the macromonomer (A). In addition, if necessary, the methacrylate (B2) and the other monomer (B3) can be used.

Examples of the acrylate (B1) include acrylates such as methyl acrylate, ethyl acrylate, n-propyl acrylate, i-propyl acrylate, n-butyl acrylate, i-butyl acrylate, t-butyl acrylate, 2-ethylhexyl acrylate, n-lauryl acrylate, n-stearyl acrylate, cyclohexyl acrylate, phenyl acrylate, benzyl acrylate, isobornyl acrylate, 2-methoxyethyl acrylate, 2-ethoxyethyl acrylate, and phenoxyethyl acrylate; hydroxyl group-containing acrylates such as 2-hydroxyethyl acrylate, 2-hydroxypropyl acrylate, 4-hydroxybutyl acrylate, and glycerol acrylate; carboxyl group-containing acrylates such as acrylic acid, 2-acryloyloxyethyl hexahydrophthalic acid, 2-acryloyloxypropyl hexahydrophthalic acid, 2-acryloyloxyethyl phthalic acid, 2-acryloyloxypropyl phthalic acid, 2-acryloyloxyethyl maleic acid, 2-acryloyloxypropyl maleic acid, 2-acryloyloxyethyl succinic acid, and 2-acryloyloxypropyl succinic acid; epoxy group-containing acrylates such as glycidyl acrylate, glycidyl α-ethyl acrylate, and 3,4-epoxy butyl acrylate; amino group-containing acrylates such as dimethylaminoethyl acrylate and diethylaminoethyl acrylate; multifunctional acrylates such as ethylene glycol diacrylate, 1,3-butylene glycol diacrylate, 1,6-hexanediol diacrylate, triethylene glycol diacrylate, tetraethylene glycol diacrylate, tripropylene glycol diacrylate, trimethylolpropane triacrylate, and allyl acrylate. One or more of these can be appropriately selected and used.

Among the above, methyl acrylate, ethyl acrylate, n-propyl acrylate, i-propyl acrylate, n-butyl acrylate, i-butyl acrylate, t-butyl acrylate, 2-ethylhexyl acrylate, n-lauryl acrylate, n-stearyl acrylate, cyclohexyl acrylate, phenyl acrylate, benzyl acrylate, isobornyl acrylate, 2-methoxyethyl acrylate, 2-ethoxyethyl acrylate, phenoxyethyl acrylate are preferable, with methyl acrylate, ethyl acrylate, n-butyl acrylate, 2-ethylhexyl acrylate, n-lauryl acrylate, phenyl acrylate, benzyl acrylate, and phenoxyethyl acrylate being particularly preferable.

In one aspect of the present invention, for the purpose of imparting flexibility, impact resistance, and tackiness, for example, methyl acrylate, ethyl acrylate, n-propyl acrylate, n-butyl acrylate, 2-ethylhexyl acrylate, 2-hydroxyethyl acrylate, and 4-hydroxybutyl acrylate can be used.

In addition, as a highly-refractive component for refractive index adjustment, for example, phenyl acrylate, benzyl acrylate, and phenoxyethyl acrylate can be used. As other purposes, for the purpose of ensuring compatibility with the macromonomer (A), for example, methyl acrylate and ethyl acrylate can be used.

Examples of the methacrylate (B2) include methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, n-lauryl methacrylate, n-stearyl methacrylate, cyclohexyl methacrylate, phenyl methacrylate, benzyl methacrylate, isobornyl methacrylate, 2-methoxyethyl methacrylate, 2-ethoxyethyl methacrylate, and phenoxyethyl methacrylate; hydroxyl group-containing methacrylates such as 2-hydroxyethyl methacrylate, 2-hydroxypropyl methacrylate, 4-hydroxybutyl methacrylate, and glycerol methacrylate methacrylic acid; carboxyl group-containing methacrylates such as methacrylic acid, 2-methacryloyloxyethyl hexahydrophthalic acid, 2-methacryloyloxypropyl hexahydrophthalic acid, 2-methacryloyloxyethyl phthalic acid, 2-methacryloyloxypropyl phthalic acid, 2-methacryloyloxy ethyl maleic acid, 2-methacryloyloxypropyl maleic acid, 2-methacryloyloxyethyl succinic acid, and 2-methacryloyloxypropyl succinic acid; epoxy group-containing methacrylates such as glycidyl methacrylate and 3,4-epoxy butyl methacrylate; amino group-containing methacrylates such as dimethylaminoethyl methacrylate and diethylaminoethyl methacrylate; and multifunctional methacrylates such as ethylene glycol dimethacrylate, 1,3-butylene glycol dimethacrylate, 1,6-hexanediol dimethacrylate, triethylene glycol dimethacrylate, tetraethylene glycol dimethacrylate, tripropylene glycol dimethacrylate, trimethylolpropane trimethacrylate, and allyl methacrylate. One or more of these can be appropriately selected and used.

Among the above, methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, n-lauryl methacrylate, n-stearyl methacrylate, cyclohexyl methacrylate, phenyl methacrylate, benzyl methacrylate, isobornyl methacrylate, 2-methoxyethyl methacrylate, 2-ethoxyethyl methacrylate, and phenoxyethyl methacrylate are preferable, with methyl methacrylate, ethyl methacrylate, n-butyl methacrylate, 2-ethylhexyl methacrylate, n-lauryl methacrylate, phenyl methacrylate, benzyl methacrylate, and phenoxyethyl methacrylate being particularly preferable.

Examples of the other monomer (B3) include carboxyl group-containing vinyl-based monomers such as crotonic acid, fumaric acid, maleic acid, itaconic acid, monomethyl maleate, and monomethyl itaconate; acid anhydride group-containing vinyl-based monomers such as maleic anhydride and itaconic anhydride; amido group-containing vinyl-based monomers such as (meth)acrylamide, N-t-butyl (meth)acrylamide, N-methylol (meth)acrylamide, N-methoxymethyl (meth)acrylamide, N-butoxymethyl acrylamide, diacetone acrylamide, maleic acid amide, and maleimide; vinyl-based monomers such as styrene, α-methylstyrene, vinyltoluene, (meth)acrylonitrile, vinyl chloride, vinyl acetate, and vinyl propionate; and multifunctional vinyl-based monomers such as divinylbenzene, and N,N'-methylenebis (meth)acrylamide. One or more of these can be appropriately selected and used.

As a compositional ratio of the comonomer (B), from the viewpoint of reactivity with the above-mentioned macromonomer (A), it is preferable that (B1:B2) which is a molar ratio of the acrylate (B1) to the methacrylate (B2) is 70:30 to 100:0, and it is more preferable that (B1:B2) is 80:20 to 100:0. In addition, it is preferable that an amount used of the other monomer (B3) is small. By setting the ratio of the acrylate (B1) and the methacrylate (B2) to be within the above range, it is possible to secure reactivity of the macromonomer (A) and the comonomer (B) and to sufficiently increase a proportion of a block polymer or graft polymer containing the macromonomer copolymer (Y). In a case where an amount of the acrylate (B1) is small, the macromonomer (A) may undergo insufficient reaction and remain unreacted, a molecular weight may not be sufficiently increased, or a reaction time may be too long.

The macromonomer (A) is preferably 0.02% to 5.0% by mol, more preferably 0.1% to 5.0% by mol, and even more 0.49% to 3.0% by mol, with respect to a total molar number of monomers contained in the polymerizable component (X).

In a case where the polymerizable component (X) is composed of the macromonomer (A) and the comonomer (B), as a charging ratio of the macromonomer (A) and the comonomer (B), (B:A) which is a charging ratio of the comonomer (B) to the macromonomer (A) is preferably in a range of 99.98:0.02 to 95.00:5.00, more preferably in a range of 99.90:0.10 to 95.00:5.00, and even more preferably in a range of 99.51:0.49 to 97.00:3.00.

In a case where an amount of the macromonomer (A) is too small, a polymer which is composed only of the comonomer (B) and does not contain the macromonomer (A) may be produced. Conversely, in a case where the amount of macromonomer (A) is too large, the case may cause a large amount of unreacted macromonomer (A) to remain. As a result of intensive studies, the present inventors have found that in a case where a charging molar ratio of the macromonomer (A) to the comonomer (B) is within the above range, a compositional ratio of the macromonomer (A) and the comonomer (B) which remain in a polymerization reaction can be kept substantially constant.

Macromonomer Copolymer (Y)

The macromonomer copolymer (Y) is obtained by copolymerizing the polymerizable component (X) that contains the macromonomer (A) and the comonomer (B). The macromonomer copolymer (Y) has units derived from the macromonomer (A) and units derived from the comonomer (B).

The macromonomer copolymer (Y) contains at least one selected from the group consisting of a block copolymer (YI) having a macromonomer (A) unit and a comonomer (B) unit, and a graft copolymer (YII) of the comonomer (B) having a macromonomer (A) unit at a side chain. Furthermore, the macromonomer copolymer (Y) can contain at least one selected from the group consisting of a polymer (YIII) composed only of the comonomer (B), a polymer having only the macromonomer (A) unit, an unreacted macromonomer (A), and an unreacted comonomer (B).

Block Copolymer (YI)

The block copolymer (YI) is a block copolymer having both the macromonomer (A) unit and a unit composed of a polymer of comonomer (B) in the same molecule. This block copolymer (YI) is produced by causing the comonomer (B), which is in a state of becoming an active species (growing radical) having a radical, to be reacted with a terminal double bond of the macromonomer (A). A terminal structure of the block copolymer (YI) includes a structure having a terminal double bond group of the same structure as the macromonomer (A). That is, the block copolymer (YI) includes a block copolymer having both the macromonomer (A) unit and a unit composed of a polymer of the comonomer (B), the block copolymer having a terminal double bond group. Such a block copolymer (YI) having a terminal double bond group is called a block macromonomer.

The macromonomer (A) as a raw material contains a methacrylate monomer unit as a main component. Thus, $X_1$ in General Formula (1) is a methyl group. On the other hand, in the terminal double bond of the block copolymer (YI), the comonomer (B) contains the acrylate (B1) as a main component. Thus, $X_1$ in General Formula (1) is a hydrogen atom. The fact that depending on a difference between the two, a position of a peak derived from proton at a trans position of the terminal double bond group in $^1$H-nuclear magnetic resonance (NMR) is different is clarified in Yamada et al.'s reports (Journal of Polymer Science: Part A: Polymer Chemistry, Vol. 41, pp. 645 to 654 (2003), Progress in Polymer Science 31 (2006) pp. 835 to 877).

The term "trans position" means a position in which a hydrogen atom is present on an opposite side to a carbonyl group with a double bond therebetween.

Graft Copolymer (YII)

The graft copolymer (YII) is produced by copolymerizing the above-mentioned block copolymer (YI) having a terminal double bond (the above-mentioned block macromonomer) with the comonomer (B). Such a graft copolymer (YII) includes a graft copolymer containing a plurality of macromonomer (A) units in the same molecule and a graft copolymer having a multi-branched structure. From the viewpoints of an ability of the macromonomer copolymer (Y) to control a micro-phase separation structure and thermal decomposition resistance, the block copolymer (YI) and the graft copolymer (YII) work well with each other, so that there is no problem in a case where the both are contained.

Polymer (YIII)

The polymer (YIII) is a polymer produced by polymerizing only the comonomer (B), and does not contain the macromonomer (A) unit in a polymer structure. The polymer (YIII) decreases an ability of the macromonomer copolymer (Y) to control a micro-phase separation structure. Thus, a smaller amount thereof is preferable.

A content of the polymer (YIII) contained in the macromonomer copolymer (Y) is preferably 20% by mass or less, more preferably 10% by mass or less, and even more preferably 5% by mass or less, with respect to a total mass of the macromonomer copolymer (Y). Specifically, the content of the polymer (VIII) is preferably 0% to 20% by mass and more preferably 0% to 10% by mass.

From the viewpoints of an ability of the macromonomer copolymer (Y) to control a micro-phase separation structure and thermal decomposition resistance, the unreacted macromonomer (A) is preferably as small as possible.

A content of the unreacted macromonomer (A) contained in the macromonomer copolymer (Y) is preferably 10% by mass or less, more preferably 5% by mass or less, and even more preferably 3% by mass or less with respect to a total mass of the macromonomer copolymer (Y). Specifically, the content of the unreacted macromonomer (A) is preferably 0% to 10% by mass, more preferably 0% to 5% by mass, and even more preferably 0% to 3% by mass.

A mass average molecular weight (Mw) of the macromonomer copolymer (Y) is preferably 30,000 to 5,000,000, and more preferably 100,000 to 1,000,000. In a case where Mw is 30,000 or more, good mechanical strength and thermal decomposition resistance of a molded body are exhibited. In a case where Mw is 5,000,000 or less, good moldability is exhibited.

In the present specification, the mass average molecular weight (Mw) is a mass average molecular weight in terms of polymethyl methacrylate measured by gel permeation chromatography (GPC).

For Hm, Ht, and Hx

Hx represented by Expression (2) will be described.

$$Hx=Hm/Ht \qquad (2)$$

Hx is an index that reflects a reaction rate of the macromonomer (A) and a production rate of the graft copolymer (YII) in the macromonomer copolymer (Y). A smaller Hx exhibits a larger amount of the graft copolymer (YII) contained in the macromonomer copolymer (Y) and a higher reaction rate of the macromonomer (A). This is because a value of Hm always is decreased in the course of a copolymerization reaction of the macromonomer (A) and the comonomer (B), and a value of the Ht is larger than the value of Hm at a later stage of polymerization.

Hm

Hm is an integrated value of a peak that corresponds to proton at a trans position of a terminal double bond group of the macromonomer (A) in $^1$H-NMR. In the macromonomer (A), a main component is methacrylate. Thus, $X_1$ is mainly a methyl group. In that case, a proton peak at the trans position of the terminal double bond group appears in the vicinity of 5.43 ppm and 5.47 ppm. A value of the Hm is gradually decreased as the macromonomer (A) is consumed in the course of a copolymerization reaction of the macromonomer (A) and the comonomer (B).

Ht

Ht is, in $^1$H-NMR, a sum of an integrated value of a peak that corresponds to proton at a trans position of a terminal double bond group of the macromonomer (A) and an integrated value of a peak that corresponds to proton at a trans position of a terminal double bond group of the block copolymer (YI). In the macromonomer (A), a main component is methacrylate. Thus, $X_1$ is mainly a methyl group, and a proton peak at the transposition of the terminal double bond group appears in the vicinity of 5.43 ppm and 5.47 ppm. On the other hand, in the block copolymer (YI), a monomer unit of a comonomer (B) is mainly composed of an acrylate (B1) monomer unit. Thus, $X_1$ in General Formula (1) is mainly a hydrogen atom, and a proton peak at the trans position of the terminal double bond group appears in the vicinity of 5.52 ppm.

For the peak in the vicinity of 5.52 ppm, which is a peak of the proton at the trans position of the terminal double bond group in a case where $X_1$ in General Formula (1) is a hydrogen atom, since production and consumption of the block copolymer (YI) simultaneously proceed in the course of the copolymerization reaction of the macromonomer (A) and the comonomer (B), the peak is gradually increased at an early stage of the polymerization and the peak is gradually decreased at a later stage of the polymerization.

An assignment of each peak in $^1$H-NMR is clarified in Yamada et al.'s reports (Journal of Polymer Science: Part A: Polymer Chemistry, Vol. 41, pp. 645 to 654 (2003), Progress in Polymer Science 31 (2006) pp. 835 to 877). A precise position of each peak in $^1$H-NMR varies depending on measurement conditions of $^1$H-NMR such as a heavy solvent and a measurement temperature. Thus, preferable measurement conditions of $^1$H-NMR will be described later.

Measurement of $^1$H-NMR

NMR Apparatus

In a case of tracing the copolymerization reaction between the macromonomer (A) and the comonomer (B), it is preferable to use a higher frequency nuclear magnetic resonance (NMR) apparatus because high resolution is required. Specifically, 250 MHz or more is preferable, 400 MHz or more is more preferable, and 500 MHz or more is even more preferable.

Sample Preparation

A heavy solvent for dissolving the macromonomer copolymer (Y) is not particularly limited as long as the heavy solvent can uniformly dissolve the macromonomer copolymer (Y), and heavy chloroform is preferable from the viewpoints of ease of availability and solubility. In particular, it is preferable to use highly pure heavy chloroform containing tetramethylsilane (TMS) as a reference substance.

The macromonomer copolymer (Y) is preferably measured without carrying out purification such as reprecipitation. In a case where a purification operation is carried out, a low molecular weight component contained in the macromonomer copolymer (Y) is removed, which may interfere with accurate analysis. Even in a case where the macromonomer copolymer (Y) is produced by solution polymerization, it is preferable that the macromonomer copolymer (Y) is directly diluted with the heavy solvent and measurement is carried out.

The macromonomer copolymer (Y) is preferably contained in a measurement sample in an amount of 5% by mass or more. In a case where a solution is too thin, it becomes difficult to detect a peak of a proton at a trans position of a terminal double bond group in General Formula (1).

NMR Measurement Conditions

In measurement of $^1$H-NMR, a greater number of integrations makes it easy to detect a peak of a proton at a trans position of the terminal double bond group in General Formula (1). The number of integrations is preferably 1,000 or more, more preferably 5,000 or more, and even more preferably 10,000 or more. A higher temperature of a sample solution at the time of measurement is preferable, and the temperature is set within an appropriate range in consideration of a boiling point of the heavy solvent. For example, in a case where heavy chloroform is used as the heavy solvent, the temperature is preferably around 40° C.

Method for Producing Macromonomer Copolymer (Y)

The method for producing the macromonomer copolymer (Y) has a step of polymerizing the polymerizable component (X) that contains the macromonomer (A) and the comonomer (B).

A method of polymerizing the polymerizable component (X) is not particularly limited, and various methods such as solution polymerization, suspension polymerization, emulsion polymerization, and bulk polymerization can be used. Water-based polymerization such as suspension polymerization or emulsion polymerization is preferable from the viewpoint of high productivity due to the fact that polymerization heat exotherm is easily controlled and a collection operation becomes more convenient. In a case of solution polymerization, it is possible to carry out a reaction in a state where uniformity of a reaction solution is kept until a later stage of the polymerization. In addition, solution polymerization and emulsion polymerization are advantageous in that such polymerization can be carried out continuously from synthesis of a macromonomer to synthesis of a macromonomer copolymer.

In the method for producing the macromonomer copolymer (Y) of the present invention, it is preferable that all of the macromonomer (A) and the comonomer (B) have already been put into the same reaction vessel at the start of a reaction. In a case where dropwise addition of the polymerizable component is necessary, it is necessary to add dropwise a mixture of the macromonomer (A) and the comonomer (B) which has been uniformly mixed in the same composition ratio as in the reaction vessel. This causes the compositional ratio of the macromonomer (A) and the comonomer (B) in the reaction vessel to be kept constant at all times, which makes it possible to suppress a phenomenon in which only the macromonomer (A) remains or only the comonomer (B) remains.

At the time of polymerization, in order to regulate a molecular weight of a polymer, mercaptans, hydrogen, α-methylstyrene dimer, terpenoids, or the like may be added as a chain transfer agent.

A content of a sulfur element contained in the macromonomer copolymer (Y) is preferably 0.002% by mass or less with respect to a total mass of the macromonomer copolymer (Y). Specifically, 0 to 0.002% by mass is preferable. In a case where the content of a sulfur element is within the above range, it is possible to decrease an unreacted macromonomer (A) and to obtain a large number of the graft copolymers (YII).

It is preferable that the macromonomer copolymer (Y) does not contain a sulfur-containing chain transfer agent residue. "Chain transfer agent residue" is a residue derived from a chain transfer agent remaining at a terminal of a polymer. In a case where the macromonomer copolymer (Y) does not contain the sulfur-containing chain transfer agent residue, it is possible to decrease an unreacted macromonomer (A) and to obtain a large number of the graft copolymers (YII).

In a case where polymerization is carried out in the presence of a radical polymerization initiator, an organic peroxide or an azo compound can be used as the radical polymerization initiator. Specific examples of the organic peroxide include 2,4-dichlorobenzoyl peroxide, t-butyl peroxypivalate, o-methylbenzoyl peroxide, bis-3,5,5-trimethylhexanoyl peroxide, octanoyl peroxide, t-butyl peroxy-2-ethyl hexanoate, cyclohexanone peroxide, benzoyl peroxide, methyl ethyl ketone peroxide, dicumyl peroxide, lauroyl peroxide, diisopropyl benzene hydroperoxide, t-butyl hydroperoxide, and di-t-butyl peroxide.

Specific examples of the azo compound include 2,2'-azobisisobutyronitrile, 2,2'-azobis(2,4-dimethylvaleronitrile), and 2,2'-azobis(2,4-dimethyl-4-methoxyvaleronitrile).

Among these, benzoyl peroxide, 2,2'-azobisisobutyronitrile, 2,2'-azobis(2,4-dimethylvaleronitrile), and 2,2'-azobis(2,4-dimethyl-4-methoxyvaleronitrile) are preferable. These radical polymerization initiators can be used alone or in combination of two or more types.

The radical polymerization initiator is preferably used within a range of 0.0001 to 10 parts by mass with respect to 100 parts by mass of a total amount of the macromonomer (A) and the comonomer (B).

A polymerization temperature is not particularly limited and is, for example, −100° C. to 250° C., preferably 0° C. to 200° C., and more preferably 60° C. to 80° C. A polymerization temperature during a time that occupies 50% or more of the entire polymerization time is 60° C. to 80° C.

Tracing of Synthetic Reaction of Macromonomer Copolymer (Y)

Reaction Rate of Macromonomer (A)

A reaction rate of the macromonomer (A) means a proportion of the macromonomer (A) which has changed to a copolymer containing a monomer unit derived from the comonomer (B). That is, the reaction rate is different from a proportion of the macromonomer (A) which has been converted to the graft copolymer (YII). This is because a terminal double bond group derived from the macromonomer (A) transfers to a terminal of the block copolymer (YI) in the course of copolymerization reaction.

The reaction rate of the macromonomer copolymer (A) in the present invention is a value obtained by high performance liquid chromatography (HPLC). In the HPLC measurement, in a case where a composition of the monomer unit contained in the macromonomer (A) is different from a composition of the comonomer (B), by appropriately setting measurement conditions, the reaction rate of the monomer (A) can be obtained from an area and a height of a macromonomer (A) peak.

Reaction Rate of Comonomer (B)

A reaction rate of the comonomer (B) can be obtained by, for example, $^1$H-nuclear magnetic resonance (NMR) or gas chromatography (GC). In a case of NMR, it is possible to obtain the reaction rate of comonomer (B) from $^1$H-NMR spectrum or $^{13}$C-NMR spectrum. In a case of the GC, it is possible to obtain the reaction rate from a proportion at which the comonomer (B) is decreased due to increase in molecular weight. The reaction rate of the comonomer (B) becomes an equivalent value in a case of being obtained by the NMR and in a case of being obtained by the GC. As the reaction rate of the comonomer (B) in the present invention, in principle, a value obtained by $^1$H-NMR is adopted. However, in a case where the reaction rate of the comonomer (B) cannot be accurately calculated in $^1$H-NMR, such as a case where a size of a reference peak cannot be estimated due to using a plurality of monomers in combination as the comonomer (B) or the like, it is also possible to obtain the reaction rate of the comonomer (B) by using the GC or another analysis method.

Terminal Double Bond Reaction Rate Derived from Macromonomer (A)

A terminal double bond derived from the macromonomer (A) transfers to a terminal of the block copolymer (YI), and then is finally incorporated into the graft copolymer (YII) and firstly consumed. That is, in a case where the terminal double bond derived from the macromonomer (A) is consumed, a branched structure is generated in the macromonomer copolymer (Y).

A higher reaction rate of the terminal double bond derived from the macromonomer (A) causes the macromonomer copolymer (Y) to contain a large number of the graft copolymers (YII), which is preferable. The reaction rate of the terminal double bond derived from the macromonomer (A) is preferably 53% by mol or more, more preferably 60% by mol or more, and more preferably 70% by mol more, with respect to a total molar number of the terminal double bonds derived from the macromonomer (A).

In the present invention, the reaction rate of the terminal double bond derived from the macromonomer (A) is a value obtained by comparing the raw material macromonomer (A) and the macromonomer copolymer (Y) by $^1$H-nuclear magnetic resonance (NMR).

In a case where a polymerization reaction is carried out so that a composition of an unreacted polymerizable component (X) is kept constant in a reaction system during the polymerization reaction, there is a tendency that the reaction rate of the terminal double bond derived from the macromonomer (A) becomes less than 100% by mol.

This is because the terminal double bond derived from the macromonomer (A) first transfers to a terminal of the block copolymer (YI), and then is incorporated into the graft copolymer (YII). That is, in a case where consumption of the macromonomer (A) and consumption of the comonomer (B) proceed in the same way, a certain amount of the block copolymer (YI) remains in a state which is before being incorporated into the graft copolymer (YII). In order to bring the reaction rate of the terminal double bond derived from the macromonomer (A) close to 100% by mol, it is conceivable to add dropwise the comonomer (B) during the polymerization reaction. However, during polymerization, a composition of the polymerizable component (X) is changed, and a large number of polymers (YIII) composed only of the comonomer are produced at the end of the polymerization.

Under polymerization conditions where the macromonomer copolymer (Y) has a sufficiently uniform composition, the reaction rate of the terminal double bond derived from the macromonomer (A) tends to be 90% by mol or less.

The reaction rate of the terminal double bond derived from the macromonomer (A) is preferably 53% by mol to 90% by mol, more preferably 60% by mol to 85% by mol, and even more preferably 70% by mol to 80% by mol, with respect to a total molar number of terminal double bonds derived from the macromonomer (A).

Calculation of Reaction Rate of Terminal Double Bond Derived from Macromonomer (A)

In a case of carrying out $^1$H-NMR measurement under the above conditions, for a case where R and $R^1$ to in General Formula (1) are methyl, a peak of a proton at the trans position of the terminal double bond group of the macromonomer (A) is observed at 5.43 ppm, 5.47 ppm, and 5.52 ppm, and a peak of a proton derived from methyl ester ($R^1$ to $R''$) in a polymethyl methacrylate portion was observed at 3.6 ppm. Therefore, the reaction rate of the terminal double bond derived from the macromonomer (A) was calculated by calculating a rate at which integrated values of the peaks at 5.43 ppm, 5.47 ppm, and 5.52 ppm are decreased with reference to an integrated value of the peak at 3.6 ppm. Specifically, the reaction rate of the terminal double bond derived from the macromonomer (A) was calculated by carrying out $^1$H-NMR measurement of the macromonomer (A) in advance, and then subjecting a reaction solution sampled during the polymerization reaction to $^1$H-NMR measurement and making a comparison.

Calculation of Reaction Rate of Comonomer (B)

In a case where the comonomer (B) is n-butyl acrylate, protons of a methylene ($-CH_2-$) site closest to an ester bond in butyl ester and protons of a methylene ($-CH_2-$) site closest to an ester bond in butyl ester of a poly n-butyl acrylate portion in the $^1$H-NMR measurement are observed at 4.1 to 4.3 ppm and 3.9 to 4.1 ppm, respectively. The reaction rate of n-butyl acrylate was calculated by calculating a ratio of an integrated value of the peak at 4.1 to 4.3 ppm and an integrated value of the peak at 3.9 to 4.1 ppm.

The macromonomer copolymer (Y) thus obtained is suitable as a molding material and an additive thereof, a raw material for a casting plate, and a raw material for paints and tacky adhesives.

The macromonomer copolymer (Y) may be used alone or as a mixture with another resin. Two or more types of the other resins may be used. In order to improve properties of the macromonomer copolymer (Y), another resin may be used, and the macromonomer copolymer (Y) may be used to improve properties of other resins.

Examples of the other resin include an acrylic resin such as poly(methyl methacrylate), polyolefin, polyamide, unsaturated polyester, saturated polyester such as polyethylene terephthalate and polybutylene terephthalate, polycarbonate, polystyrene, ABS resin, AS resin, polyvinyl chloride, and polyvinylidene fluoride.

Molding Material (C)

A molding material (C) contains the macromonomer copolymer (Y) and is a composition used for molding. For the molding material (C), it is possible to use the macromonomer copolymer (Y) alone or in combination of two or more types. Furthermore, the molding material (C) may contain another resin in addition to the macromonomer copolymer (Y). Examples of the other resin include acrylic resin such as poly(methyl methacrylate), polyolefin, polyamide, unsaturated polyester, saturated polyester such as polyethylene terephthalate and polybutylene terephthalate, polycarbonate, polystyrene, ABS resin, AS resin, polyvinyl chloride, and polyvinylidene fluoride.

A proportion of the other resin contained in the molding material (C) is preferably 0% to 95% by mass, and more preferably 20 to 80% by mass, with respect to a total weight of the molding material.

As a method of mixing the polymer and the other polymer, for example, a physical mixing method such as a Henschel mixer and a blender, and a melt mixing method such as an extruder are mentioned.

In addition, various additives can be added to the molding material (C), if necessary. Examples of the additives include various stabilizers such as an antioxidants, an ultraviolet absorber, and a thermal stabilizer, colorants such as an inorganic pigment, an organic pigment, and a dye; conductivity imparting agents such as carbon black and ferrite; and inorganic fillers, lubricating materials, releasing agents, plasticizers, organic peroxides, neutralizing agents, cross-linking agents, and the like. A proportion of these additives is preferably 0% to 20% by mass, and more preferably 1% to 5% by mass, with respect to a total weight of the molding material.

Examples of a shape of a molded body to be molded using the molding material (C) include a sheet shape and a three-dimensional shape. As a molding method for obtaining a molded body, a cast molding method and a melt molding method are preferable, and, for example, an injection molding method, a compression molding method, a blow molding method, an extrusion molding method, a rotational molding method, a casting method, and a solvent-cast molding method are mentioned. Cast-molded body (D)

In the cast molding method, a syrup (E) containing the macromonomer copolymer (Y) is prepared, and a cast-molded body (D) is produced through a step of carrying out polymerization and curing in a mold. Syrup (E) is prepared by adding a macromonomer (Y) and a monomer (F) as essential components and, if necessary, adding other components. The cast molding method has an advantage that a micro-phase separation structure excited by the macromonomer copolymer (Y) is easily fixed as compared with a melt molding method.

A proportion of the macromonomer copolymer (Y) contained in the syrup (E) is, for example, preferably 5% to 80% by mass, and more preferably 10% to 70% by mass.

Examples of the monomer (F) used for the syrup (E) are the same as the examples of the raw material monomer of the above-mentioned macromonomer (A), including preferred embodiments.

As other components used for the syrup (E), thermal-polymerization initiators such as a peroxide and an azo compound; photo-polymerization initiators such as (1-hydroxycyclohexyl)phenylmethanone and phenylbis(2,4,6-trimethylbenzoyl)phosphine oxide; various stabilizers such as an antioxidant, an ultraviolet absorber, and a heat stabilizer; colorants such as an inorganic pigment, an organic pigment, and a dye; conductivity imparting agents such as carbon black and ferrite; inorganic fillers; lubricating materials; releasing agents; plasticizers; organic peroxides; neutralizing agents; crosslinking agents; and acrylic resins such as polymethylmethacrylate are mentioned.

Examples of a shape of the cast-molded body (D) include a sheet shape and a three-dimensional shape.

EXAMPLES

Hereinafter, the present invention will be described in more detail by way of examples and comparative examples. However, the present invention is not limited by the following examples.
Method of Analyzing Macromonomer Copolymer (Y)
GPC Measurement Mw and Mn were obtained using gel permeation chromatography (GPC).
Measurement conditions are shown below.
Apparatus: HLC-8220 (manufactured by Tosoh Corporation)
Column: TSK GUARD COLUMN SUPER H-H (4.6×35 mm, manufactured by Tosoh Corporation) and two TSK-GEL SUPER HM-H (6.0×150 mm, manufactured by Tosoh Corporation) are connected in series
Eluent: Tetrahydrofuran
Measurement temperature: 40° C.
Flow rate: 0.6 mL/min
Mw (mass average molecular weight) and Mn (number average molecular weight) were calculated using a calibration curve prepared by using polymethyl methacrylates (4 types of Mp (peak molecular weight)=141,500, 55,600, 11,100, and 1,590) which are manufactured by Polymer Laboratories. A molecular weight distribution was calculated by an expression "molecular weight distribution= (mass average molecular weight)/(number average molecular weight)".
NMR Measurement Values of Hm and Ht for obtaining Hx are obtained by $^1$H-NMR measurement. The $^1$H-NMR measurement was carried out using a nuclear magnetic resonance apparatus. Measurement conditions are shown below.
Apparatus: UNITY INOVA 500 (frequency of 500 MHz, manufactured by Varian)
Heavy solvent: Heavy chloroform (0.05 v/v % of tetramethylsilane (TMS) added, purity of 99.7%, manufactured by Sigma-Aldrich)
Sample preparation: A toluene solution was prepared in which a proportion of a total weight of the polymerizable component (X) and the macromonomer copolymer (Y) which is a reaction product of the polymerizable component (X) is 33% by mass. Subsequently, 1.1 g of heavy chloroform was added with respect to 0.225 g of the toluene solution, and the mixture was used as a sample solution for NMR measurement. A weight ratio of heavy chloroform and toluene in the sample solution for NMR measurement was 88:12. The polymerizable component (X) contained in the sample solution for NMR measurement and the macromonomer copolymer which is a reaction product of the polymerizable component (X) were 5.66% by mass.
Measurement condition: Number of integration of 10,000, measurement temperature of 40° C.
Analytical method: A position of a proton peak of tetramethylsilane was set at 0.00 ppm, and positions of the respective peaks were determined. Peaks derived from protons at trans positions of terminal double bond groups of the macromonomer (A) and the block copolymer (YI) were observed at 5.43 ppm, 5.47 ppm, and 5.52 ppm.
HPLC Measurement A reaction rate of the macromonomer (A) was measured using high performance liquid chromatography (HPLC). Measurement conditions are shown below.
Apparatus: Alliance e2695 (manufactured by Waters)
Column: TSKgel ODS100V (5 μm, 4.6×150 mm, manufactured by Tosoh Corporation)
Eluent: Acetonitrile (Solution A), tetrahydrofuran (Solution B)
Gradient condition: Linear gradient 0 min (Solution A/Solution B=100/0)–10 min (Solution A/Solution B=0/100)–15 min (Solution A/Solution B=0/100)
Measurement temperature: 40° C.
Flow rate: 1.0 mL/min
Detector: Charged particle detector, Corona ultra RS (manufactured by Thermo Fisher Scientific Inc.)
A reaction solution sampled during polymerization reaction was dissolved in tetrahydrofuran, and the mixture was used as a sample solution. In addition, the macromonomer (A) was dissolved in tetrahydrofuran, and the mixture was used as a standard solution. A calibration curve was prepared from an area and a height of a peak corresponding to the macromonomer (A) in a chromatogram of the standard solution. Using this calibration curve, a reaction rate of the macromonomer (A) was obtained from an area and a height of a peak corresponding to the macromonomer (A) in a chromatogram of the sample.
Reprecipitation The macromonomer copolymer (Y) obtained by solution polymerization was collected by carrying out reprecipitation to eliminate the solvent and the remaining comonomer (B). First, 200 parts by mass of toluene was added to 100 parts by mass of a polymerization reaction solution to obtain 300 parts by mass of a diluted solution. Subsequently, the diluted solution was poured into 3,000 parts by mass of methanol to generate a precipitate, and the precipitate was filtered to obtain a collected solid material. The collected material was dried under reduced pressure to obtain a macromonomer copolymer (Y).

Measurement of Thermal Decomposition Resistance

A thermal decomposition resistance was evaluated by tracing a weight loss of the macromonomer copolymer (Y) using a thermogravimetric/differential thermal analyzer. Measurement conditions are shown below.

Apparatus: TG/DTA 6300 manufactured by SII Nanotechnology Inc.

Measurement condition: Nitrogen stream of 200 mL/min, 40° C. to 550° C., temperature elevation rate of 10° C./min Measurement of ΔHaze Value A molding material containing the macromonomer copolymer (Y) was injection-molded to obtain a molded plate having a thickness of 2 mm, and then measurement of a haze value was carried out. Measurement conditions are shown below.

Apparatus: NDH 2000 manufactured by Nippon Denshoku Industries Co., Ltd. Measurement condition: A total light transmittance was evaluated in accordance with ES K7361-1, and a Haze value was evaluated in accordance with HS K7316.

A 2 mm-thick plate prepared with VH001 (polymethyl methacrylate, trade name, manufactured by Mitsubishi Rayon Co., Ltd.) was used as a standard plate, and a difference with a haze value of each sample was calculated as a ΔHaze value. By making a comparison with the ΔHaze value, it is possible to compare values of internal haze excluding an influence of external haze.

Production Example 1: Synthesis of Dispersant (1)

61.6 parts of a 17% by mass potassium hydroxide aqueous solution, 19.1 parts of methyl methacrylate, and 19.3 parts of deionized water were charged into a reaction apparatus equipped with a stirrer, a cooling pipe, and a thermometer. Subsequently, a solution in the reaction apparatus was stirred at room temperature, an exothermic peak was checked, and then stirring was carried out for 4 hours. Thereafter, a reaction solution in the reaction apparatus was cooled to room temperature so that a potassium methacrylate aqueous solution was obtained.

Subsequently, 900 parts of deionized water, 70 parts by mass of a 42% by mass sodium 2-sulfoethyl methacrylate aqueous solution (trade name: Acrylester SEM-Na, manufactured by Mitsubishi Rayon Co., Ltd.), 16 parts of the above-mentioned potassium methacrylate aqueous solution, and 7 parts of methyl methacrylate were placed in a polymerization apparatus equipped with a stirrer, a cooling pipe, and a thermometer, and stirred. A temperature of a solution in the reaction apparatus was elevated to 50° C. while replacing an inside of the polymerization apparatus with nitrogen. 0.053 part of V-50 (2,2'-azobis(2-methylpropionamidine)dihydrochloride, trade name, manufactured by Wako Pure Chemical Industries, Ltd.) as a polymerization initiator was added to the polymerization apparatus, and a temperature of the solution in the reaction apparatus was elevated to 60° C. After putting the polymerization initiator, 1.4 parts of methyl methacrylate was added portionwise every 15 minutes in a total of 5 times (total amount of methyl methacrylate of 7 parts). Thereafter, the solution in the polymerization apparatus was kept at 60° C. for 6 hours while stirring, and then cooled to room temperature so that a dispersant (1) having a solid content of 8% by mass was obtained as a transparent aqueous solution.

Production Example 2: Synthesis of Chain Transfer Agent (1)

2.00 g (8.03 mmol) of cobalt acetate (II) tetrahydrate (Wako Special Grade, manufactured by Wako Pure Chemical Industries, Ltd.), 3.86 g (16.1 mmol) of diphenyl glyoxime (EP grade, manufactured by Tokyo Chemical Industry Co., Ltd.), and 100 ml of diethyl ether which had been previously deoxidized by nitrogen bubbling were placed in a synthesis apparatus equipped with a stirrer under a nitrogen atmosphere, and the mixture was stirred at room temperature for 2 hours.

Subsequently, 20 ml of boron trifluoride diethyl ether complex (EP grade, manufactured by Tokyo Chemical Industry Co., Ltd.) was added and the mixture was further stirred for 6 hours. The obtained product was filtered, the solid was washed with diethyl ether, and dried under 100 MPa or less at 20° C. for 12 hours to obtain 5.02 g (7.93 mmol, yield of 99% by mass) of a reddish-brown solid chain transfer agent (1).

Production Example 3 Synthesis of Macromonomer (A-1)

135 parts of deionized water, 0.1 part of sodium sulfate ($Na_2SO_4$), and 0.26 parts by mass of the dispersant (1) (solid content of 10% by mass) produced in Production Example 1 were placed in a polymerization apparatus equipped with a stirrer, a cooling tube, and a thermometer, and stirred to obtain a uniform aqueous solution. Next, 100 parts of methyl methacrylate, 0.00125 parts by mass of the chain transfer agent (1) produced in Production Example 2, and 0.1 part by mass of Perocta 0 (1,1,3,3-tetramethylbutyl peroxy 2-ethylhexanoate, trade name, manufactured by NOF Corporation) was added to obtain an aqueous dispersion.

Subsequently, an inside of the polymerization apparatus was sufficiently replaced with nitrogen, a temperature of the aqueous dispersion was elevated to 80° C. and kept for 3 hours, and then the temperature was elevated to 90° C. and kept for 2 hours. Thereafter, the reaction solution was cooled to 40° C. to obtain an aqueous suspension of macromonomer. This aqueous suspension was filtered through a filter cloth, and the filtrate was washed with deionized water and dried at 40° C. for 16 hours to obtain a macromonomer (A-1). The macromonomer (A-1) had an average particle size of 95 μm, Mw of 20,000, and Mn of 11,000. An introduction rate of a terminal double bond in the macromonomer (A-1) was almost 100%.

Production Example 4 Synthesis of Macromonomer (A-2)

135 parts of deionized water, 0.1 parts of sodium sulfate ($Na_2SO_4$), and 0.26 parts by mass of the dispersant (1) (solid content of 10% by mass) produced in Production Example 1 were placed in a polymerization apparatus equipped with a stirrer, a cooling tube, and a thermometer, and stirred to obtain a uniform aqueous solution. Next, 95 parts of methyl methacrylate, 5 parts of methyl acrylate, 0.00240 parts by mass of the chain transfer agent (1) prepared in Production Example 2, and 0.1 parts by mass of Perocta O (1,1,3,3- tetramethylbutyl peroxy 2-ethylhexanoate, trade name, manufactured by NOF Corporation) was added to obtain an aqueous dispersion.

Subsequently, an inside of the polymerization apparatus was sufficiently replaced with nitrogen, a temperature of the aqueous dispersion was elevated to 80° C. and kept for 3 hours, and then the temperature was elevated to 90° C. and kept for 2 hours. Thereafter, the reaction solution was cooled to 40° C. to obtain an aqueous suspension of macromonomer. This aqueous suspension was filtered through a filter cloth, and the filtrate was washed with deionized water and dried at 40° C. for 16 hours to obtain a macromonomer (A-2). The macromonomer (A-2) had an average particle size of 95 μm, Mw of 23,600, and Mn of 12,600. An introduction rate of a terminal double bond in the macromonomer (A-2) was almost 100%.

Example 1 Synthesis of Macromonomer Copolymer (Y-1)

In the present example, a macromonomer copolymer (Y-1) was produced by a solution polymerization method.

100 parts of toluene (manufactured by Wako Pure Chemical Industries, Ltd.) and 64.0 parts of the macromonomer (A-1) produced in Production Example 3 were placed in a separable flask equipped with a stirrer, a cooling tube, and a thermometer, and stirred at 50° C. for 1 hour to obtain a uniform solution. Once the temperature was cooled to room temperature, 36.0 parts of n-butyl acrylate (manufactured by Mitsubishi Chemical Corporation), and 0.3 parts of V59 (AMEN (2,2-azobis (2-methylbutyronitrile), trade name, manufactured by Wako Pure Chemical Industries, Ltd.) were added and stirred to obtain a uniform solution. Nitrogen bubbling was carried out for 30 minutes to replace an atmosphere in the separable flask with nitrogen. Subsequently, polymerization was started by elevating the temperature to 69° C., and the reaction was allowed to proceed while sampling the reaction solution after 30 minutes, 2 hours, and 5 hours. Then, the reaction was cooled to room temperature to obtain a polymer solution containing a macromonomer copolymer (Y).

20 mg of the obtained polymer solution was weighed and diluted with 5 mL of tetrahydrofuran, and GPC measurement was carried out. In addition, 0.15 g of the obtained polymer solution was weighed and diluted with 1.2 g of heavy chloroform, and NMR measurement was carried out. Furthermore, HPLC measurement was also carried out.

The obtained macromonomer copolymer had Mn of 34,200, Mw of 79,800, and a molecular weight distribution (Mw/Mn) of 2.3. A reaction rate of the macromonomer (A) obtained from the HPLC measurement was 81%. A reaction rate of the comonomer (B) obtained from the NMR measurement was 85%, a reaction rate of a terminal double bond derived from the macromonomer (A) was 60% by mol, a value of Ht in a case where a value of Hm was set as 1.00 was 3.47, a value of Hx was 0.29, and an unreacted macromonomer (A) was 7.5% by mass.

Next, 100 parts by mass of the obtained polymer solution was diluted with 200 parts of toluene (manufactured by Wako Pure Chemical Industries, Ltd.), and then the diluted solution was put into 3,000 parts by mass of methanol (manufactured by Wako Pure Chemical Industries, Ltd.) to generated a precipitate. The obtained precipitate was collected by filtration, and dried under reduced pressure to obtain a purified macromonomer copolymer. An injection molded plate having a thickness of 2 mm was obtained from the obtained purified macromonomer copolymer by using a trace amount kneading injection molding machine (manufactured by Imoto Machinery Co., Ltd.). A ΔHaze which is a difference in haze with a 2 mm-thick injection molded plate made of VH001 (polymethyl methacrylate, trade name, manufactured by Mitsubishi Rayon Co., Ltd.) by the same method was 5%. In addition, a thermal decomposition resistance was evaluated with the reprecipitated macromonomer copolymer using a thermogravimetric/differential thermal analyzer. As a result, a 5% weight loss temperature was 268° C. Polymerization conditions and evaluation results are summarized in Table 1.

Examples 2 to 7, and Comparative Examples 1 and 2

Examples 2 to 7 and Comparative Examples 1 and 2 were carried out by changing the respective polymerization conditions to contents described in Table 1, so that macromonomer copolymers were obtained. The analysis and evaluation results of Examples 2 to 7 and Comparative Examples 1 and 2 are shown in Table 1. Due to being obtained as a highly viscous liquid, the macromonomer copolymer obtained in Example 4 could not prepare a molded plate. Therefore, a ΔHaze value is not obtained.

Examples 5 to 7

For Examples 5 to 7, each of the obtained polymer solutions was reprecipitated using hexane, a hexane-soluble component was isolated, and a weight proportion thereof was calculated. Subsequently, $^1$H-NMR measurement was carried out on the hexane-soluble component to obtain a polymer composition. The analysis results of the hexane-soluble components of Examples 5 to 7 are summarized in Table 2. In Table 2, "MMA" means methyl methacrylate and "BA" means n-butyl acrylate.

Referring to the evaluation results of Examples 1 to 7, due to the fact that a reaction rate of a terminal double bond derived from the macromonomer (A) is as high as 53% by mol to 78% by mol and a value of Hx is also as low as 0.13 to 0.29, it is shown that the macromonomer (A) efficiently reacts with the comonomer (B) so that a large number of graft copolymers (YII) are produced. An unreacted macromonomer (A) is as low as 0.6% by mass to 7.5% by mass, and a 5% weight loss temperature is as high as 268° C. to 336° C. In addition, a ΔHaze value is 3% to 6%, which is sufficiently high in transparency. On the other hand, in Comparative Examples 1 and 2, a reaction rate of a terminal double bond derived from the macromonomer (A) is low, a value of Hx is large, a large number of unreacted macromonomers (A) are present, and a 5% weight loss temperature is low.

Furthermore, referring to the evaluation results of Examples 5 to 7, both reaction rates of the macromonomer (A-2) and the comonomer (B) are 90% or more, and a reaction rate of a terminal double bond derived from (A-2) was 74% to 78% by mol.

Furthermore, referring to Table 2, a 5% weight loss temperature was 324° C. to 332° C., and a thermal decomposition resistance was further improved as compared with Examples 1 to 4. An unreacted macromonomer (A) contained in the macromonomer copolymer was as low as 2.5% to 3.2% by weight, and a hexane-soluble component containing a polymer composed only of the comonomer (B) was 5% or less. Therefore, it is conceivable that the macromonomer copolymers of Examples 6 to 8 have a further increased thermal decomposition resistance, contain a large number of graft copolymers, and exert excellent performance in microphase separation structure control, as compared with the macromonomer copolymers of Examples 1 to 4.

TABLE 1

|  |  |  | Example 1 | Example 2 | Example 3 | Example 4 | Example 5 |
|---|---|---|---|---|---|---|---|
| Charging ratio (parts by mass) | Macromonomer (A) | (A-1) | 64.0 | 47.0 | 30.0 | 8.0 |  |
|  |  | (A-2) |  |  |  |  | 30.0 |
|  | Comonomer (B) | n-butyl acrylate | 36.0 | 53.0 | 70.0 | 92.0 | 70.0 |
|  | Thermal-polymerization initiator | V59(AMBN) AIBN | 0.3 | 0.3 | 0.3 | 0.3 | 0.3 |
|  | Solvent | Toluene | 100 | 200 | 200 | 200 | 100 |
| Macromonomer (A) in polymerizable component [% by mol] |  |  | 2.0 | 1.0 | 0.5 | 0.1 | 0.43 |
| Polymerization temperature [° C.] |  |  | 69° C. | 69° C. | 69° C. | 69° C. | 69° C. |
| Polymerization time [hr] |  |  | 5 | 5 | 5 | 5 | 5 |
| Number average molecular weight Mn |  |  | 34,200 | 29,300 | 44,000 | 61,100 | 70,700 |
| Mass average molecular weight Mw |  |  | 79,900 | 67,800 | 106,200 | 157,000 | 207,500 |
| Molecular weight distribution Mw/Mn |  |  | 2.3 | 2.3 | 2.4 | 2.6 | 2.9 |
| Reaction rate of macromonomer (A) [%] |  |  | 81% | 78% | 84% | 85% | 92% |
| Reaction rate of comonomer (B) [%] |  |  | 85% | 81% | 83% | 87% | 90% |
| Reaction rate of terminal double bond derived from macromonomer (A) [%] |  |  | 60% | 54% | 53% | 59% | 75% |
| Hx = Hm/Ht |  |  | 0.29 | 0.29 | 0.26 | 0.13 | 0.28 |
| Unreacted macromonomer (A) [% by mass] |  |  | 7.5% | 7.1% | 4.1% | 0.6% | 2.5% |
| ΔHaze value [%] |  |  | 5% | 3% | 4% | Not moldable | 6% |
| 5% weight loss temperature [° C.] |  |  | 268 | 282 | 318 | 336 | 332 |

|  |  |  | Example 6 | Example 7 | Comparative Example 1 | Comparative Example 2 |
|---|---|---|---|---|---|---|
| Charging ratio (parts by mass) | Macromonomer (A) | (A-1) |  |  | 90.5 | 57.5 |
|  |  | (A-2) | 40.0 | 50.0 |  |  |
|  | Comonomer (B) | n-butyl acrylate | 60.0 | 50.0 | 9.5 | 42.5 |
|  | Thermal-polymerization initiator | V59(AMBN) AIBN | 0.3 | 0.3 | 0.3 | 0.09 |
|  | Solvent | Toluene | 100 | 100 | 200 | 100 |
| Macromonomer (A) in polymerizable component [% by mol] |  |  | 0.67 | 1.01 | 10.0 | 1.55 |
| Polymerization temperature [° C.] |  |  | 69° C. | 69° C. | 69° C. | 70° C. |
| Polymerization time [hr] |  |  | 5 | 8 | 5 | 6 |
| Number average molecular weight Mn |  |  | 59,800 | 55,400 | 11,900 | 32,700 |
| Mass average molecular weight Mw |  |  | 174,000 | 131,300 | 21,700 | 66,000 |
| Molecular weight distribution Mw/Mn |  |  | 2.9 | 2.4 | 1.8 | 2.0 |
| Reaction rate of macromonomer (A) [%] |  |  | 93% | 95% | 21% | 78% |
| Reaction rate of comonomer (B) [%] |  |  | 90% | 91% | 40% | 72% |
| Reaction rate of terminal double bond derived from macromonomer (A) [%] |  |  | 74% | 78% | 17% | 52% |
| Hx = Hm/Ht |  |  | 0.27 | 0.21 | 0.73 | 0.46 |
| Unreacted macromonomer (A) [% by mass] |  |  | 3.2% | 2.8% | 57.6% | 14.3% |
| ΔHaze value [%] |  |  | 4% | 6% | 2% | 3% |
| 5% weight loss temperature [° C.] |  |  | 328 | 324 | 172 | 242 |

TABLE 2

|  | Example 5 | Example 6 | Example 7 |
|---|---|---|---|
| Composition of hexane-soluble component (weight ratio of monomer unit) | MMA/BA 3/97 | MMA/BA 11/89 | MMA/BA 12/88 |
| Proportion of hexane-soluble component (% by weight) | 5.0% | 4.0% | 3.2% |

According to the present invention, a macromonomer copolymer having a high ability to control a micro-phase separation structure and a good thermal decomposition resistance is obtained.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A macromonomer copolymer (Y), comprising:
a monomer unit of a macromonomer (A) represented by Formula (1); and
a monomer unit of a comonomer (B) copolymerizable with the macromonomer (A),
wherein a value of Hx represented by Expression (2) is 0.05 to 0.40, and a content of a polymer composed only of the monomer unit of the comonomer (B) which is contained in the macromonomer copolymer (Y) is 10% by mass or less with respect to a total mass of the macromonomer copolymer (Y),

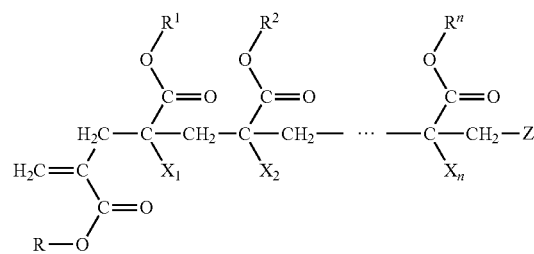

wherein in the Formula (1):

R and $R^1$ to $R^n$ are each independently a hydrogen atom, an alkyl group, a cycloalkyl group, an aryl group, or a heterocyclic group, $X_1$ to $X_n$ are each independently a hydrogen atom or a methyl group, Z is a terminal group, and n is a natural number of 2 to 10,000, $$Hx = Hm/Ht \quad (2)$$

wherein in Expression (2):

Hm is a proton-integrated value of a terminal double bond group at a trans position in $^1$H-NMR in a case where $X_1$ in General Formula (1) is a methyl group, and Ht is a proton-integrated value of a terminal double bond group at a trans position in $^1$H-NMR in a case where $X_1$ in Formula (1) is a methyl group and a hydrogen atom.

2. The macromonomer copolymer (Y) according to claim 1, wherein a content of a sulfur element contained in the macromonomer copolymer (Y) is 0.002% by mass or less with respect to a total mass of the macromonomer copolymer (Y).

3. The macromonomer copolymer (Y) according to any claim 1, wherein the macromonomer copolymer (Y) does not contain a sulfur-containing chain transfer agent residue.

4. The macromonomer copolymer (Y) according to claim 1, wherein a content of an unreacted macromonomer (A) contained in the macromonomer copolymer (Y) is 10% by mass or less with respect to a total mass of the macromonomer copolymer (Y).

5. The macromonomer copolymer (Y) according to claim 1, wherein a content of methacrylate monomer unit in the macromonomer (A) is 80% by mass or more with respect to a total mass of the macromonomer (A).

6. A method for producing a macromonomer copolymer (Y) according to claim 1, comprising:

carrying out a polymerization reaction of a polymerizable component (X) composed of a macromonomer (A) represented by Formula (1) and a comonomer (B) copolymerizable with the macromonomer (A), so that a reaction rate of terminal double bonds derived from the macromonomer (A) at the end of the polymerization reaction is 53% by mol to 90% by mol with respect to a total molar number of the terminal double bonds derived from the macromonomer (A),

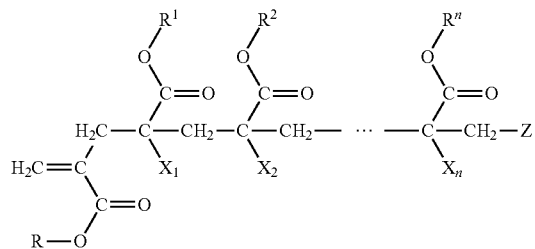

(1)

wherein in the Formula (1):

R and $R^1$ to $R^n$ are each independently a hydrogen atom, an alkyl group, a cycloalkyl group, an aryl group, or a heterocyclic group, $X_1$ to $X_n$ are each independently a hydrogen atom or a methyl group, Z is a terminal group, and n is a natural number of 2 to 10,000.

7. The method for producing a macromonomer copolymer (Y) according to claim 6, wherein the comonomer (B) is composed only of acrylate.

8. The method for producing a macromonomer copolymer (Y) according to claim 6, wherein a content of the macromonomer (A) is 0.02% by mol to 8.0% by mol with respect to 100% by mol of the polymerizable component (X).

9. The method for producing a macromonomer copolymer (Y) according to claim 6, wherein a polymerization temperature during a time that occupies 50% or more of the entire polymerization time is 60° C. to 80° C.

10. The method for producing a macromonomer copolymer (Y) according to claim 6, wherein the entire amount of the macromonomer (A) and the comonomer (B) is charged at one time, and then the polymerization reaction is initiated.

11. The method for producing a macromonomer copolymer (Y) according to claim 6, wherein the macromonomer (A) has a number average molecular weight (Mn) of 1,000 or more.

* * * * *